(12) United States Patent
Hecht

(10) Patent No.: US 11,420,272 B2
(45) Date of Patent: Aug. 23, 2022

(54) MILLING HEAD HAVING INTEGRALLY FORMED CUTTING EDGES AND ROTARY MILLING TOOL

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 86 days.

(21) Appl. No.: 16/578,862

(22) Filed: Sep. 23, 2019

(65) Prior Publication Data
US 2020/0215626 A1  Jul. 9, 2020

Related U.S. Application Data

(60) Provisional application No. 62/789,690, filed on Jan. 8, 2019.

(51) Int. Cl.
*B23C 5/08* (2006.01)
*B23C 5/26* (2006.01)

(52) U.S. Cl.
CPC . *B23C 5/08* (2013.01); *B23C 5/26* (2013.01)

(58) Field of Classification Search
CPC ....... B23C 2240/245; B23C 5/28; B23C 5/08; B23C 5/26; B23C 2240/24; B23C 2210/02
See application file for complete search history.

(56) References Cited

U.S. PATENT DOCUMENTS

| | | | |
|---|---|---|---|
| 1,337,313 A | | 4/1920 | Groene |
| 2,381,540 A | * | 8/1945 | Horth ........................ B23C 5/06 407/58 |
| 6,431,799 B1 | | 8/2002 | Francis et al. |
| 6,571,451 B2 | | 6/2003 | Satran et al. |
| 8,468,918 B2 | | 6/2013 | Kadosh et al. |

(Continued)

FOREIGN PATENT DOCUMENTS

| | | | |
|---|---|---|---|
| EP | 2520396 A1 | * 11/2012 | ............... B23C 5/28 |
| JP | 2006-281371 | 10/2006 | |
| WO | WO 2010/021487 | 2/2010 | |

OTHER PUBLICATIONS

English translation of EP 2520396 A1 (Year: 2012).*

(Continued)

*Primary Examiner* — Alan Snyder
(74) *Attorney, Agent, or Firm* — Womble Bond Dickinson (US) LLP

(57) ABSTRACT

A rotary milling tool has a tool holder and a milling head releasably attached thereto. The milling head has a plurality of angularly spaced apart peripherally disposed cutting edges which form an effective cutting edge. The milling head has a head through recess opening out to the head forward and rearward surfaces. The recess includes a centering region and a driven region, the driven region being axially forward of, and non-identical to, the centering region. The driven region has at least one driven surface facing opposite a rotational direction. The centering region has at least one radially inwardly facing radial centering surface located axially rearward of, and radially outward from, the at least one driven surface. The two opposing extremities of the effective cutting edge define two parallel planes respectively between which both the at least one driven surface and the at least one radial centering surface are disposed.

29 Claims, 9 Drawing Sheets

(56) References Cited

U.S. PATENT DOCUMENTS

| | | |
|---|---|---|
| 8,708,611 B2 | 4/2014 | Marshansky |
| 9,751,138 B2 | 9/2017 | Morrison et al. |
| 2004/0022594 A1 | 2/2004 | Hecht |
| 2007/0081872 A1 | 4/2007 | Blomstedt et al. |
| 2007/0081873 A1 | 4/2007 | Blomstedt et al. |
| 2012/0039676 A1 | 2/2012 | Marshansky |
| 2018/0318941 A1 | 11/2018 | Chang |

OTHER PUBLICATIONS

International Search Report dated Apr. 6, 2020, issued in PCT counterpart application (No. PCT/IL2019/051428).

Written Opinion dated Apr. 6, 2020, issued in PCT counterpart application (No. PCT/IL2019/051428).

* cited by examiner

MILLING HEAD HAVING INTEGRALLY FORMED CUTTING EDGES AND ROTARY MILLING TOOL

RELATED APPLICATIONS

The present application claims priority to U.S. Provisional Patent Application No. 62/789,690 filed Jan. 8, 2019. The contents of the aforementioned application are incorporated by reference in their entirety.

FIELD OF THE INVENTION

The subject matter of the present application relates to rotary milling tools having a milling head with a plurality of peripherally disposed cutting edges integrally formed therewith, and in particular to such a milling head having at least one driven surface for torque transfer from a tool holder and at least one radial centering surface for radial alignment of milling head with said tool holder.

BACKGROUND OF THE INVENTION

Rotary milling tools can include a milling head releasably clamped to a tool holder by a fastening member, e.g. a retaining screw. The milling head can have a plurality of peripherally disposed cutting edges. The cutting edges can be integrally formed with the milling head. During assembly, the milling head can be radially centered on the tool holder (i.e. the milling head and the tool holder become co-axial) via radial alignment and centering surfaces located on the tool holder and milling head, respectively. Moreover, during cutting operations, torque is transferred from the tool holder to the milling head via driving and driven surfaces located on the tool holder and milling head, respectively.

A variety of such cutting tools and milling heads are disclosed in U.S. Pat. No. 6,431,799 B1, U.S. Pat. No. 6,571,451 B2, U.S. Pat. No. 8,468,918 B2, U.S. Pat. No. 9,751,138 B2, US 2007/0081873 A1, US 2018/0318941 A1 and WO 2010/021487.

SUMMARY OF THE INVENTION

In accordance with a first aspect of the subject matter of the present application there is provided a milling head having a head central axis that defines opposite forward and rearward directions and about which the milling head is rotatable in a rotational direction, the milling head comprising:

opposing head forward and rearward surfaces and a head peripheral surface extending therebetween, the head peripheral surface extending circumferentially about the head central axis;

a plurality of angularly spaced apart peripherally disposed cutting edges whose rotational loci in an axial half plane containing the head central axis define an effective cutting edge about the head central axis having axially spaced apart opposing cutting edge extremities which define an effective cutting edge length measured in the axial direction, each cutting edge being formed at the intersection of a rotationally forward rake surface and a rotationally rearward relief surface and being integrally formed with the milling head to have unitary one-piece construction therewith; and a head through recess extending along the head central axis and opening out to the head forward and rearward surfaces, the head through recess being defined by a recess peripheral surface and comprising a centering region and a driven region, the driven region being axially forward of, and non-identical to, the centering region; wherein:

the recess peripheral surface at the driven region comprises at least one driven surface facing opposite the rotational direction;

the recess peripheral surface at the centering region comprises at least one radially inwardly facing radial centering surface located axially rearward of, and radially outward from, the at least one driven surface;

the two opposing extremities of the effective cutting edge define two parallel head forward and rearward planes respectively, the head forward and rearward planes being oriented perpendicularly to the head central axis and spaced apart by the effective cutting edge length; and both the at least one driven surface and the at least one radial centering surface are disposed between the head forward and rearward planes.

In accordance with a second aspect of the subject matter of the present application there is provided a rotary milling tool comprising:

a milling head, of the type described above; and a tool holder, having a holder central axis that defines opposite forward and rearward directions and about which the tool holder is rotatable in the rotational direction, the tool holder comprising:

a shank portion comprising a shank peripheral surface which extends circumferentially about the holder central axis; and a coupling portion disposed at a forward end of the shank portion, the coupling portion comprising:

an alignment portion comprising a forward facing alignment forward surface bounded by an alignment peripheral surface which extends circumferentially about the holder central axis; and a driving portion projecting forwardly from the alignment forward surface and comprising a forward facing driving forward surface bounded by a driving peripheral surface which extends circumferentially about the holder central axis; wherein:

the driving peripheral surface comprises at least one driving surface facing the rotational direction;

the alignment peripheral surface comprises at least one radially outwardly facing radial alignment surface located axially rearward of, and radially outward from, the at least one driving surface; wherein:

the milling head is releasably attached to the tool holder.

It is understood that the above-said is a summary, and that features described hereinafter may be applicable in any combination to the subject matter of the present application, for example, any of the following features may be applicable to the milling head and the rotary milling tool:

The milling head can comprise:

a plurality of angularly spaced apart cutting portions extending radially outwardly, each cutting edge being located at a respective cutting portion; and a plurality of angularly spaced apart chip flutes which circumferentially alternate with the plurality of cutting portions along the head peripheral surface, each chip flute opening out to at least one of the head forward surface and the head rearward surface.

Each chip flute can open out to both the head forward surface and the head rearward surface.

Each cutting edge can extend across the head peripheral surface from the head forward surface to the head rearward surface.

Each cutting edge can extend continuously across the head peripheral surface.

The centering region can adjoin the head rearward surface.

The at least one radial centering surface can lie on an inner surface of an imaginary centering cylinder having an axis aligned with the head central axis.

The recess peripheral surface at the centering region can comprise exactly one radial centering surface which extends along an entire circumferential extent of the recess peripheral surface.

The recess peripheral surface can comprise at least one rearwardly facing axial bearing surface located axially between the at least one driven surface and the at least one radial centering surface.

The at least one axial bearing surface can be located radially between the at least one driven surface and the at least one radial centering surface.

The at least one axial bearing surface can be planar and oriented perpendicularly to the head central axis.

The recess peripheral surface can comprise exactly one axial bearing surface which extends along an entire circumferential extent of the recess peripheral surface.

No part of the milling head may extend beyond the head rearward plane in the rearward direction.

No part of the milling head may extend beyond the head forward plane in the forward direction.

The recess peripheral surface at the driven region can comprise at least one driven tooth projecting radially inwardly. Each of the at least one driven surfaces can be located on a respective driven tooth.

The at least one driven tooth can be mirror asymmetrical about all driven tooth axial half planes containing the head central axis and intersecting said at least one driven tooth.

The recess peripheral surface at the driven region can comprise a plurality of driven teeth angularly disposed about the head central axis.

The recess peripheral surface at the driven region can comprise N driven teeth, N being a positive integer. The milling head can exhibit N-fold rotational symmetry about the head central axis.

The recess peripheral surface can comprise at least one forwardly facing clamping surface located axially forward of the at least one driven surface.

The clamping surface can be located radially outward from the at least one driven surface.

The head through recess can comprise a fastening head receiving region which is axially forward of, and non-identical to, the driven region.

The fastening head receiving region can adjoins the head forward surface.

In axial view thereof, the milling head has a head circumscribed circle defined by the plurality of cutting edges and a head inscribed circle defined by radially innermost portions of the recess peripheral surface. The head circumscribed circle has a head circumscribed circle diameter and the head inscribed circle has a head inscribed circle diameter. The head inscribed circle diameter can be greater than a third of the head circumscribed circle diameter.

The alignment forward surface can comprise at least one forwardly facing axial support surface located axially between the at least one driving surface and the at least one radial alignment surface.

The tool holder can comprise a threaded bore opening out to the driving forward surface at a bore outlet opening.

The at least one driven surface of the milling head can abut the at least one driving surface of the coupling portion.

The at least one radial centering surface of the milling head can abut the at least one radial alignment surface of the coupling portion.

On the milling head, the recess peripheral surface can comprise at least one rearwardly facing axial bearing surface located axially between the at least one driven surface and the at least one radial centering surface. On the coupling portion, the alignment forward surface can comprise at least one forwardly facing axial support surface located axially between the at least one driving surface and the at least one radial alignment surface. The at least one axial bearing surface can abut the at least one axial support surface.

The milling head can be releasably clamped to the tool holder by a fastening member located in the head through recess and threadingly engaged with the threaded bore.

The fastening member can comprise a fastening head. The fastening head can clampingly abut the milling head at the at least one clamping surface.

The fastening member may not extend beyond the head forward plane in the forward direction.

The fastening member can be an integrally formed retaining screw having unitary one-piece construction.

The external thread can comprise at least one unthreaded portion extending from both ends of the external thread so that the external thread is non-continuous. The threaded bore can be a through bore having a bore rear inlet opening. The bore rear inlet opening can be in fluid communication with the bore outlet opening via the at least one unthreaded portion.

BRIEF DESCRIPTION OF THE FIGURES

For a better understanding of the present application and to show how the same may be carried out in practice, reference will now be made to the accompanying drawings, in which.

Figure 1:
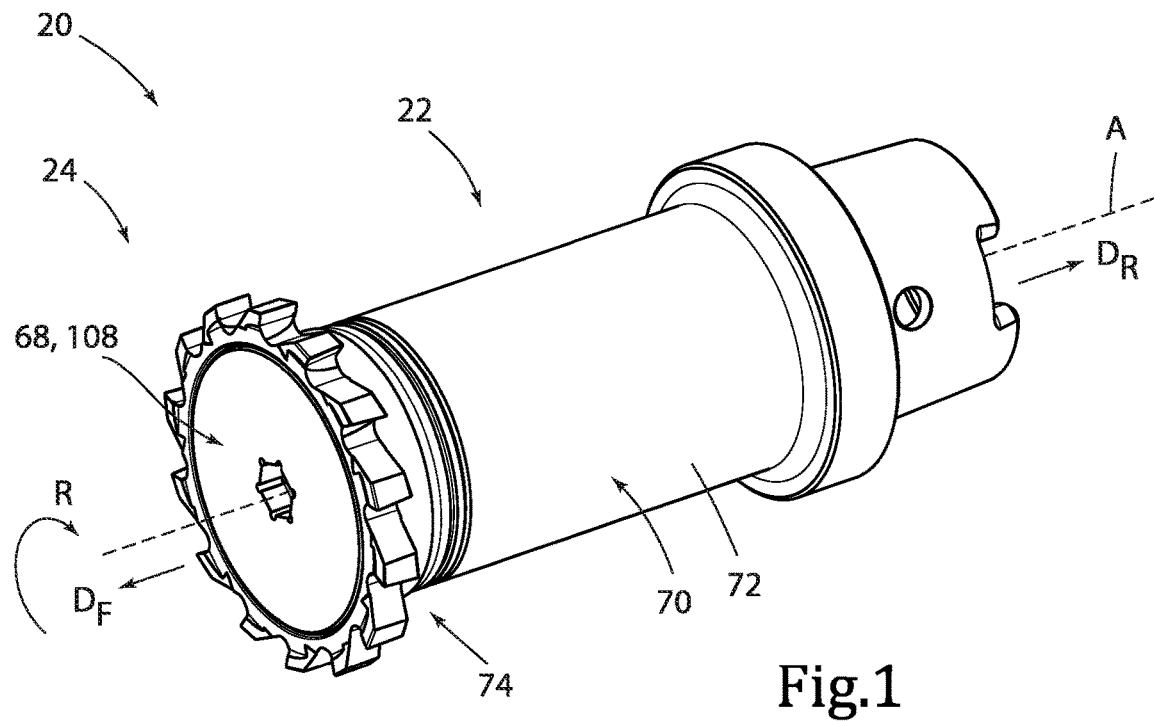
FIG. 1 is a perspective view of a rotary milling tool, in accordance with the present application.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
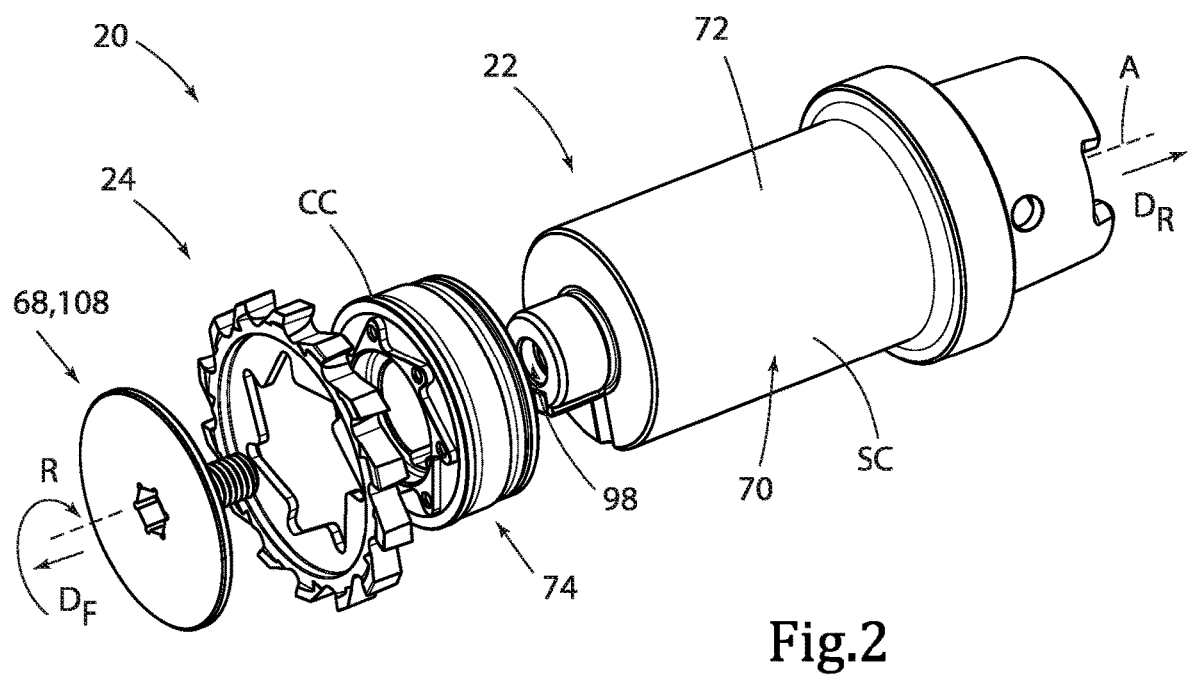
FIG. 2 is an exploded perspective view of the rotary milling tool shown in FIG. 1.

Attention is first drawn to FIGS. 1 and 2, showing a rotary milling tool 20, depicting an aspect of the present application. In this non-limiting example shown in the drawings, the rotary milling tool 20 can form a slot cutting tool suitable for slotting cutting operations. For example, the rotary milling tool 20 can be suitable for "T" slotting and/or Internal Groove Milling and/or Slitting. The rotary milling tool 20 has a tool central axis A. The rotary milling tool 20 has a tool holder 22, 122 which can be typically made from steel. The rotary milling tool 20 has a milling head 24 which can be typically made from cemented carbide. The milling head 24 is releasably attached to the tool holder 22, 122.

It is noted that the term "slot cutting tool" as used herein may be replaced with other to terms applicable in the metal cutting field for such cutting tools, for example, "slotting cutter", "slitting cutter", "grooving cutter", "slot mill cutter", "groove cutting tool", "side cutting tool", "disc cutting tool", and the like.

Reference is now made also to FIGS. 3 to 8, showing another aspect of the subject matter of the present application, relating to the milling head 24. The milling head 24 has a head central axis B. The head central axis B defines opposite forward and rearward directions $D_F$, $D_R$. The head central axis B forms an axis of rotation about which the milling head 24 is rotatable in a rotational direction R.

It should be appreciated that in the following discussion with regard to the milling head 24 use of the terms "forward" and "rearward" throughout the description and claims refer to a relative position in a direction of the head central axis B downwardly (or rearward direction $D_R$) and upwardly (or forward directions $D_F$), respectively, in FIG. 6. Moreover, the terms "axial" and "radial" are with respect to the head central axis B, unless specified otherwise.

Figure 3:
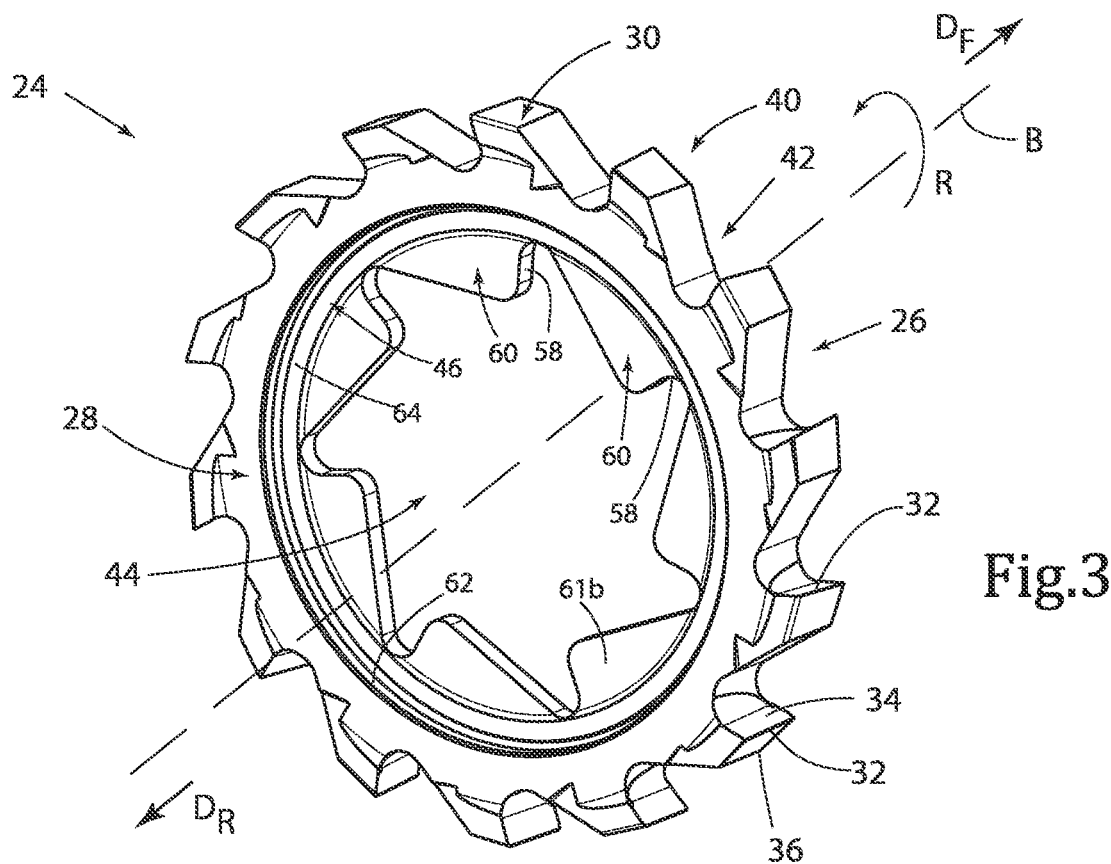
FIG. 3 is a perspective view of a milling head shown in FIG. 1.
Figure 4:
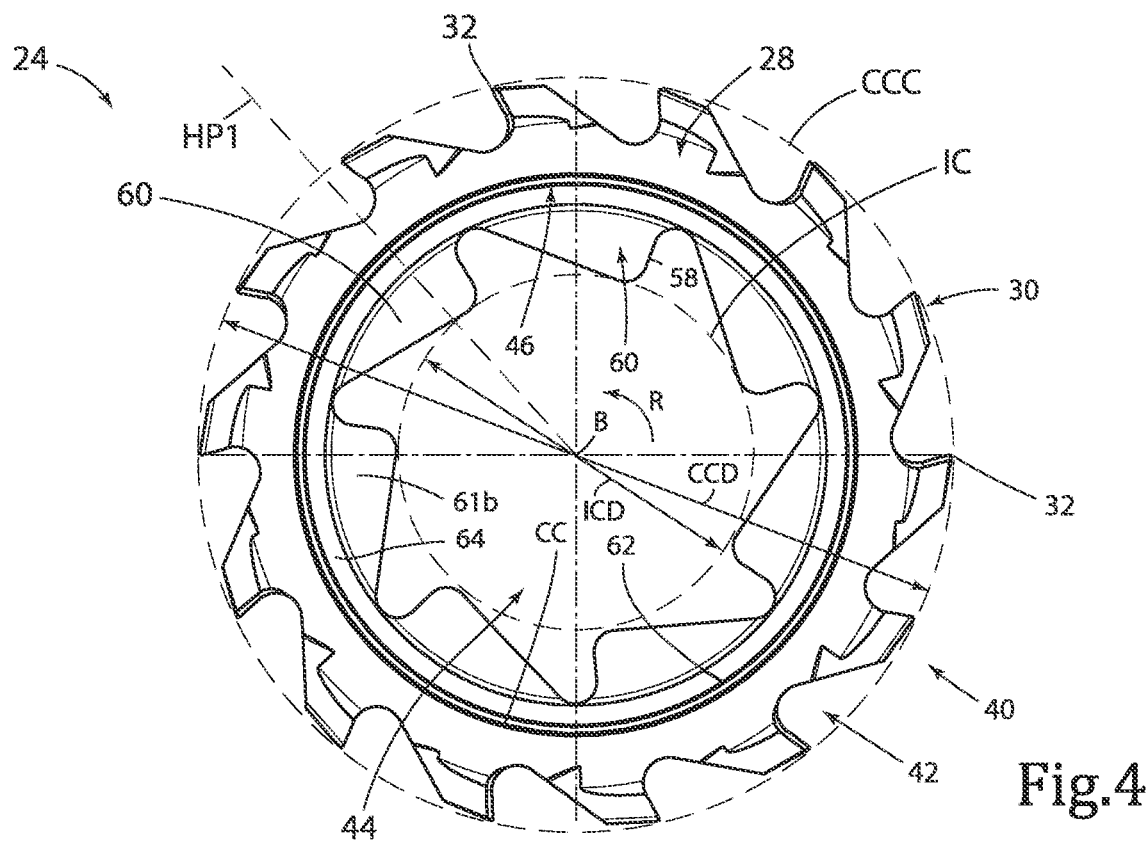
FIG. 4 is a rearward end view of the milling head shown in FIG. 3.
Figure 5:
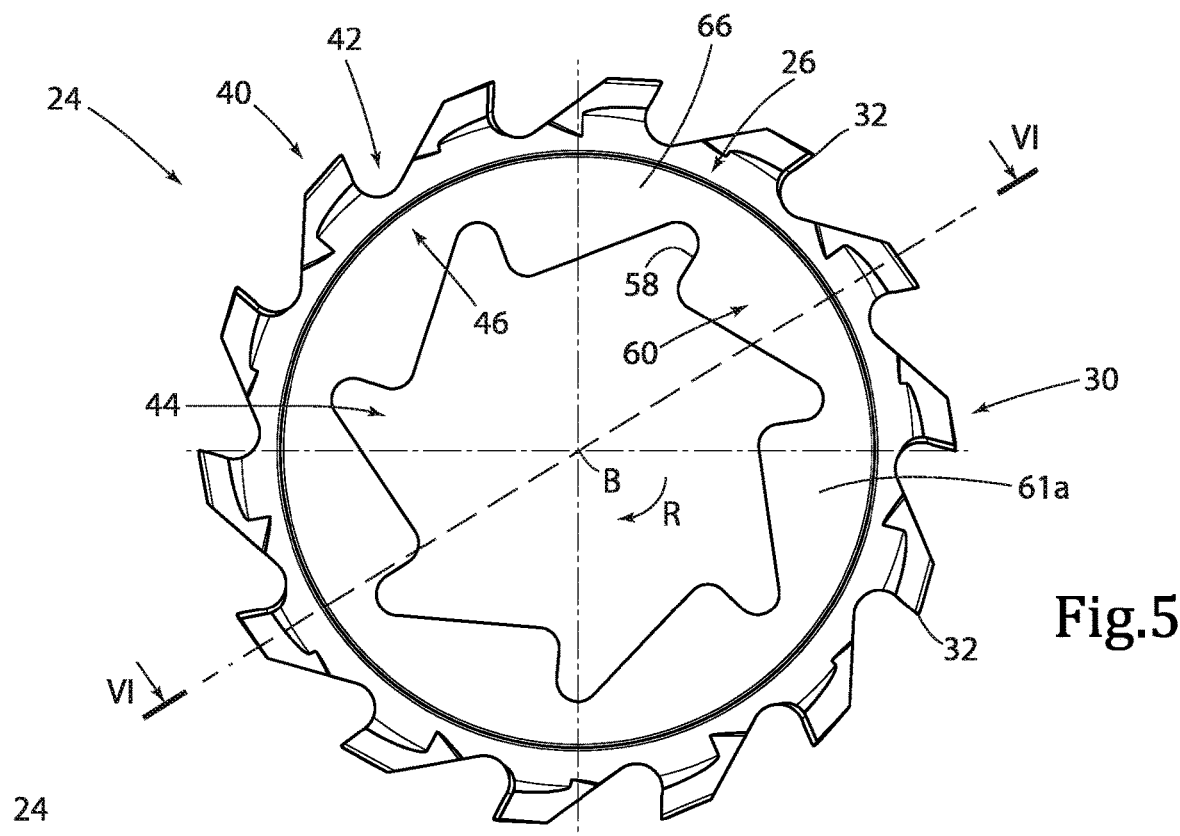
FIG. 5 is a forward end view of the milling head shown in FIG. 3

As shown in FIGS. 3 to 5, the milling head 24 includes opposing head forward and rearward surfaces 26, 28 and a head peripheral surface 30 which extends therebetween. The head forward surface 26 is axially forward of the head rearward surface 28. The head peripheral surface 30 extends circumferentially about the head central axis B. Generally speaking, the head peripheral surface 30 faces radially outwardly. In accordance with some embodiments of the subject matter of the present application, as shown in FIG. 6, the milling head 24 can be shorter in the axial direction that in the radial direction. The milling head 24 can have a disc-like basic shape defined by the head forward and rearward surfaces 26, 28 and the head peripheral surface 30.

The milling head 24 includes a plurality of cutting edges 32. The plurality of cutting edges 32 are integrally formed with the milling head 24 to have unitary one-piece construction therewith. Thus, the periphery of the milling head 124 is devoid of replaceable cutting inserts. The plurality of cutting edges 32 are angularly spaced apart about the head central axis B. The plurality of cutting edges 32 are located at the head peripheral surface 30. That is to say, the plurality of cutting edges 32 are peripherally disposed. Referring to FIG. 3, each cutting edge 32 is formed at the intersection of a rotationally forward rake surface 34 and a rotationally rearward relief surface 36. In this non-limiting example shown in the drawings, generally speaking, each cutting edge 32 can extend in the axial direction. However, the each cutting edge 32 can be convex. In particular, each cutting edge 32 can include two sub-cutting edges that converge together to form a basic "V" shape (in a view in front of the rake surface). In accordance with some embodiments of the subject matter of the present application, each cutting edge 32 can extend continuously across the head peripheral surface 30 in the axial direction. Each cutting edge 32 can extend across the entire axial extent of the head peripheral surface 30 (i.e. from the head forward surface 26 to the head rearward surface 28).

Figure 8A:
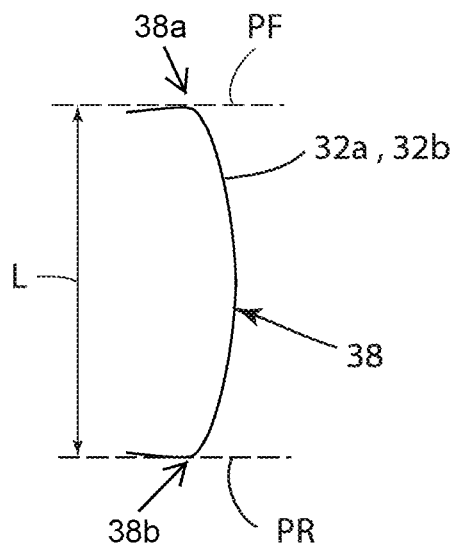
FIG. 8*a*-8*c* are three schematic diagrams taken in a head axial half-plane, showing each showing an effective cutting edge.
Figure 8B:
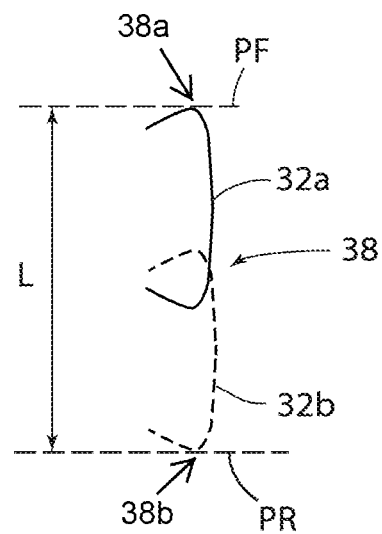
Figure 8C:
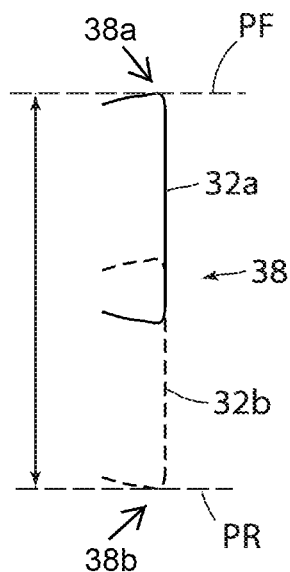

As is known in the art, the plurality of cutting edges 32 can be aligned in the axial direction (as disclosed in US 2018/0318941 A1, e.g. see FIG. 4). Alternatively, as is also known in the art, the plurality of cutting edges 32 the cutting edges 32 can be offset in the axial direction (as disclosed, for example, in U.S. Pat. No. 6,431,799 B1 and U.S. Pat. No. 8,468,918 B2, where circumferentially alternate cutting edges 32 form two sets of axially offset cutting edges 32). Each of the plurality of cutting edges 32 form a rotational locus about the head central axis B. The rotational loci of the plurality of cutting edges 32 can be partly or fully co-incident with each other. The rotational loci of the plurality of cutting edges 32 can intersect with each other. The rotational loci of the plurality of cutting edges 32 generate a corresponding outer envelope of a body of revolution as the rotary milling tool 20 rotates around the head central axis B by 360°. To exemplify the foregoing reference is made to FIGS. 8a-8c, representing three non-limiting examples showing the rotational loci of a first and a second cutting edge 32a, 32b in a head axial half plane containing the head central axis B, in accordance with the invention. In FIG. 8a, the rotational loci are fully co-incident. In FIG. 8b, the rotational loci intersect with each other. In FIG. 8c, the rotational loci are partly co-incident. It is noted that the cutting head 24, in accordance with the invention, is not limited to two cutting edges. In the head axial half plane, the rotational loci of the plurality of cutting edges 32 define an effective cutting edge 38. The effective cutting edge 38 has an effective cutting edge length L measured in the axial direction. For slot cutting tools, the effective cutting edge 38 extends continuously across the entire axial extent of the periphery of the milling head 24. The effective cutting edge length L defines the width of a slot cut in a work piece when the milling head 24 rotates in the rotational direction R and enters the work piece.

The effective cutting edge 38 includes two axially spaced apart opposing extremities 38a, 38b, between which the effective cutting edge 38 extends. The two opposing extremities 38a, 38b define the effective cutting edge length L. The two opposing extremities 38a, 38b of the effective cutting edge 38 define parallel head forward and rearward planes PF, PR respectively. The head forward and rearward planes PF, PR are oriented perpendicularly to the head central axis B and spaced apart by the effective cutting edge length L. The milling head 24 has a head median plane M parallel to the head forward and rearward planes PF, PR and located midway therebetween.

Referring to FIGS. 4 and 5, the milling head 24 includes a plurality of angularly spaced apart cutting portions 40 which extend radially outwardly. Each cutting edge 32 is located at a respective cutting portion 40. The milling head 24 includes a plurality of angularly spaced apart chip flutes 42, for chip evacuation. The plurality of chip flutes 42 circumferentially alternate with the plurality of cutting portions 40 along the head peripheral surface 30. In accordance with some embodiments of the subject matter of the present application, each chip flute 42 can open out to at least one of the head forward surface 26 and the head rearward surface 28. Each chip flute 42 can open out to both the head forward surface 26 and the head rearward surface 28.

The milling head 24 includes a head through recess 44 which opens out to the head forward and rearward surfaces 26, 28. The head through recess 44 extends along the head central axis B. Stated differently, the head central axis B passes through the head through recess 44. Thus, the milling head 24, can be crown-like. The head through recess 44 is defined by a recess peripheral surface 46. The recess peripheral surface 46 extends circumferentially about the head central axis B. Generally speaking, the recess peripheral surface 46 faces radially inwardly. Referring to FIG. 4, in an axial view thereof, the milling head 24 has a head circumscribed circle CCC (centered at the head central axis B) defined by the plurality of cutting edges 32. The head circumscribed circle CCC has a head circumscribed circle diameter CCD. The milling head 24 has a head inscribed circle IC (centered at the head central axis B) defined by the radially innermost portions of the recess peripheral surface 46. The head inscribed circle IC has a head inscribed circle diameter ICD. The head inscribed circle diameter ICD can be greater than a third of the head circumscribed circle diameter CCD. Advantageously this reduces the amount of material required to manufacture the milling head 24.

Figure 6:
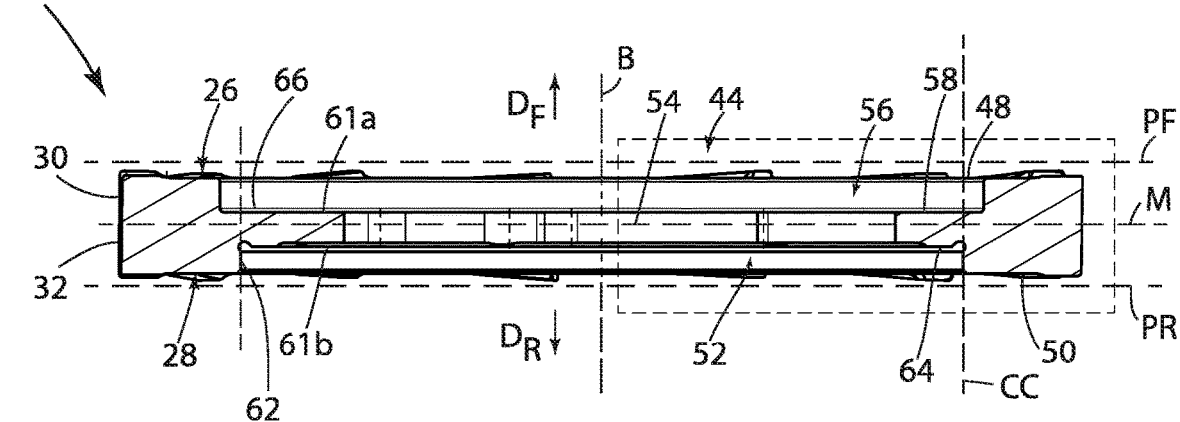
FIG. 6 is an axial cross-sectional view of the milling head in FIG. 3, taken along line VI-VI in FIG. 5.
Figure 7:
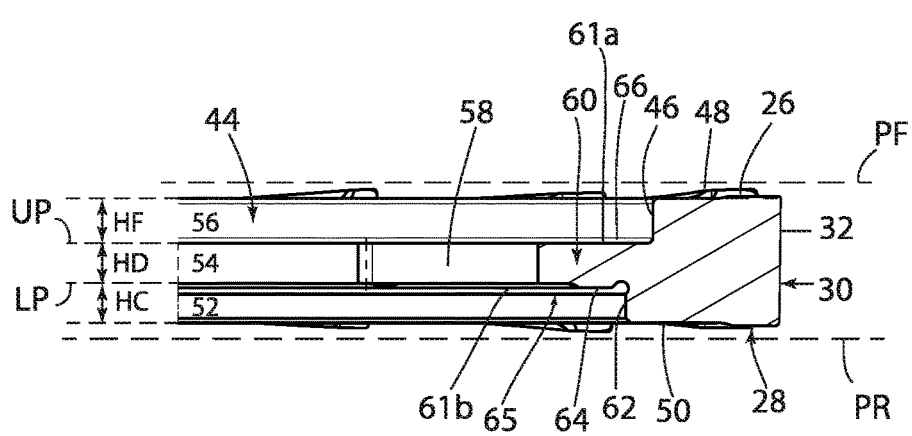
FIG. 7 is a detail of FIG. 6.

Referring in particular to FIG. 6, showing an axial cross-sectional view of the milling head 24 through a driven surface 58, and FIG. 7, showing a detail of FIG. 6. In accordance with some embodiments of the subject matter of the present application, the head forward surface 26 can include a head forward central surface 48 which surrounds and adjoins the head through recess 44. The head forward central surface 48 can be planar and perpendicular to the head central axis B. The head rearward surface 28 can include a head rearward central surface 50 which surrounds and adjoins the head through recess 44. The head rearward central surface 50 can be planar and perpendicular to the head central axis B. The head forward and rearward central surfaces 48, 50 can be parallel with each other. As shown in FIG. 7, the head forward and rearward central surfaces 48, 50 can be located within the head forward and rearward planes PF, PR. The cutting portions 40 and chip flutes 42 can extend inwardly to the head forward and rearward central surfaces 48, 50.

As seen in FIGS. 6 and 7, the head through recess 44 does not extend uniformly along the head central axis B. The head through recess 44 includes two axially offset regions, a centering region 52 and a driven region 54. The driven region 54 is axially forward of the centering region 52. The recess peripheral surface 46 at the driven region 54 defines a boundary which is different than the boundary defined by the recess peripheral surface 46 at the centering region 52. Thus, the centering region 52 and the driven region 54 are non-identical. In accordance with some embodiments of the subject matter of the present application, the centering region 52 can have a constant cross section in a radial plane along the head central axis B. The driven region 54 can have a constant cross section in a radial plane along the head central axis B, different to the cross section of the centering region 52.

As shown in FIG. 7, as measured in the axial direction, the centering region 44 has a centering region height HC and the driven region 54 has a driven region height HD. In accordance with some embodiments of the subject matter of the present application, the driven region height HD can be equal to the centering region height HC. The centering region 52 can adjoin the head rearward surface 28. The head through recess 44 can include a third axially offset region, namely a fastening head receiving region 56. The fastening head receiving region 56 is axially forward of the driven region 54. The fastening head receiving region 56 can be non-identical to driven region 54. The fastening head receiving region 56 can be non-identical to centering region 52. Thus, the milling head 24 can be mirror asymmetrical about the head median plane M. The fastening head receiving region 56 can be wider than the driven region 54 in the radial direction. As shown in FIG. 7, as measured in the axial direction, the fastening head receiving region 56 has a fastening head receiving region height HF. The fastening head receiving region height HF can be equal to the driven region height HD. The fastening head receiving region 56 can adjoin the head forward surface 26. It is noted that in an end view of the milling head 24, the see though part of the through recess 44 is formed by the driven region 54, and not by the centering region 52 nor by the fastening head receiving region if present 56.

The recess peripheral surface 46 at the driven region 54 includes at least one driven surface 58 which faces opposite the rotational direction R. The at least one driven surface 58 is configured for torque transfer from a corresponding surface on the tool holder 22, 122. The at least one driven surface 58 is disposed between the head forward and rearward planes PF, PR. The at least one driven surface 58 can be planar and extend in an axial plane of the milling head 24 which contains the head central axis B.

Reference is made to FIG. 7. In accordance with some embodiments of the subject matter of the present application, the recess peripheral surface 46 at the driven region 54 can include at least one driven tooth 60 which projects radially inwardly. The at least one driven tooth 60 includes two opposing forward and rearward driven tooth side walls 61a, 61b, respectively, which define the at least one driven tooth 60 in the axial direction. The fastening head receiving region 56 and the driven region 54 can be delimited by an upper plane UP defined by the forward driven tooth side walls 61a. The centering region 52 and the driven region 54 can be delimited by a lower plane defined by the rearward driven tooth side walls 61b. The driven region 54 can be radially inwards of than the centering region 52 in all radial directions. Each of the at least one driven surfaces 58 can be located on a respective driven tooth 60. Referring to FIG. 4, the at least one driven teeth 60 can be mirror asymmetrical about all driven tooth axial half planes HP1 which contain the head central axis B and intersect the said at least one driven teeth 60. Such a configuration can prevent the milling head 24 from inadvertently being reversed. (That is to say, the milling head 24 cannot be attached to the tool holder 22, 122 when flipped over 180° about an axis perpendicular to the head central axis B contained in the driven tooth axial half planes HP1). The recess peripheral surface 46 at the driven region 54 can include a plurality of driven teeth 60 angularly disposed about the head central axis B. The recess peripheral surface 46 at the driven region 54 can include N driven teeth 60, N being a positive integer. The milling head 24 can exhibit N-fold rotational symmetry about the head central axis B.

The recess peripheral surface 46 at the centering region 52 includes at least one radial centering surface 62 which faces radially inwardly. The at least one radial centering surface 62 is located axially rearward of the at least one driven surface 58. The at least one radial centering surface 62, in its entirety, is located radially outward from the at least one driven surface 58. The at least one radial centering surface 62 is disposed between the head forward and rearward planes PF, PR.

Figure 10:
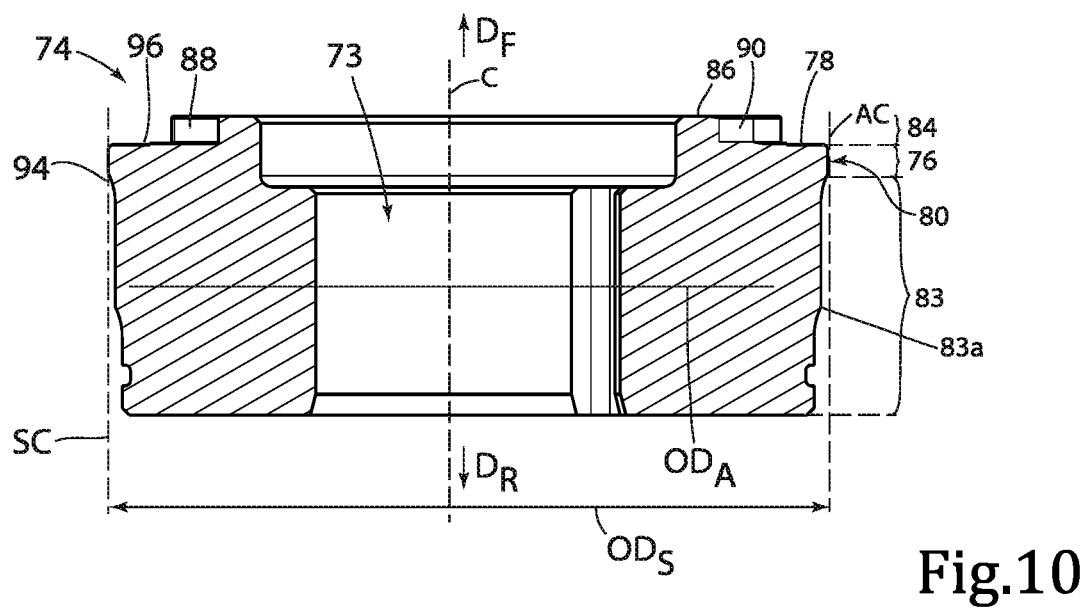
FIG. 10 is an axial cross-sectional view of the coupling portion shown in FIG. 9, taken along line X-X in FIG. 9.
Figure 13:
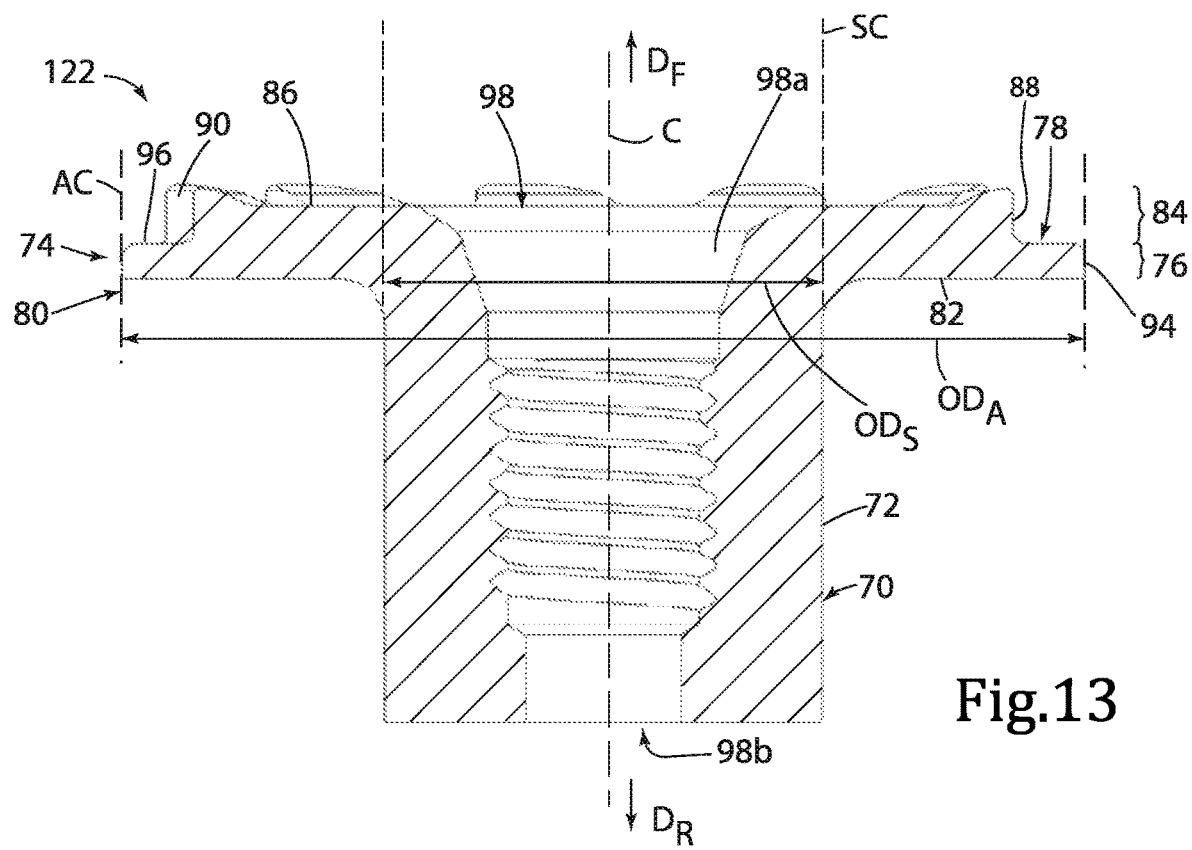
FIG. 13 is an axial cross-sectional view of the tool holder shown in FIGS. 11 and 12.

Referring to FIGS. 10 and 13, in accordance with some embodiments of the subject matter of the present application, the at least one radial centering surface 62 can lie on an inner surface of an imaginary centering cylinder having an axis aligned with the head central axis B. The recess peripheral surface 46 at the centering region 52 can include exactly one radial centering surface 62 which extends along an entire circumferential extent of the recess peripheral surface 46.

In accordance with some embodiments of the subject matter of the present application, the recess peripheral surface 46 can include at least one rearwardly facing axial bearing surface 64. The at least one axial bearing surface 64 is designed to locate the milling head 24 in a predetermined axial position with respect to the tool holder 22, 122. The at least one axial bearing surface 64 can be formed on the recess peripheral surface 46 at the centering region 52 adjacent the driven region 54. The at least one axial bearing surface 64 can be located axially between the at least one driven surface 58 and the at least one radial centering surface 62. It is noted that the at least one axial bearing surface 64 is formed in a through recess and not on a side (non-recessed) surface of the milling head 24 (as disclosed in e.g. JP2006281371). The at least one axial bearing surface 64 can be located between the head forward and rearward planes PF, PR. The at least one axial bearing surface 64 can be located radially between the at least one driven surface 58 and the at least one radial centering surface 62. The at least one axial bearing surface 64 can be planar and oriented perpendicularly to the head central axis B. Referring to FIG. 7, the at least one axial bearing surface 64 can be formed on a circular bearing projection 65 projecting rearwardly from the rearward driven tooth side wall 61b. The recess peripheral surface 46 can include exactly one axial bearing surface 64 which extends along an entire circumferential extent of the recess peripheral surface 46.

In accordance with some embodiments of the subject matter of the present application, the recess peripheral surface 46 can include at least one forwardly facing clamping surface 66 for clamping abutment with a fastening member 68, as described later on in the description. The at least one clamping surface 66 can be formed on the recess peripheral surface 46 at the fastening head receiving region 56 adjacent the driven region 54. The clamping surface 66 can be located axially forward of the at least one driven surface 58. The clamping surface 66 can be located radially outward from the at least one driven surface 58.

In accordance with some embodiments of the subject matter of the present application, no part of the milling head 24 can extend beyond the head rearward plane PR in the rearward direction $D_R$. Thus, the milling head 24 is devoid of any projection projecting rearwardly from the head rearward plane PR as disclosed in, for example, U.S. Pat. No. 8,708,611. Similarly, no part of the milling head 24 can extend beyond the head forward plane PF in the forward direction $D_F$ (and thus, the effective cutting edge length L can define the maximum axial dimension of the milling head 24 as measured in the axial direction). Advantageously, this reduces the amount of material required to manufacture the milling head 24, which is particularly important for large milling heads.

Thus, as seen in the figures, the head recess 44 comprises a toothed hub 44 provided with a plurality of circumferentially spaced apart, radially inwardly projecting, mirror-asymmetric driven teeth 60 with driven surfaces 58, a stepped arrangement comprising a radially inwardly facing centering surface 62 and a rearwardly facing recessed axial bearing surface 64 on a rearward facing side of the hub 44, and a recessed forwardly facing clamping surface 66 on a forward facing side of the hub 44.

Reference is now made to FIGS. 9 to 13, depicting the tool holder 22, 122. The tool holder 22, 122 has a holder central axis C. The holder central axis C extends in the forward and rearward directions $D_F$, $D_R$. The holder central axis C forms an axis of rotation about which the tool holder 22, 122 is rotatable in the rotational direction R.

It should be appreciated that in the following discussion with regard to the tool holder 22, 122, use of the terms "forward" and "rearward" throughout the description and claims refer to a relative position in a direction of the holder central axis C downwardly and upwardly, respectively, in FIG. 10. Moreover, the terms "axial" and "radial" are with respect to the holder central axis C, unless specified otherwise.

The tool holder 22, 122 includes a shank portion 70. The shank portion 70 includes a shank peripheral surface 72 which extends circumferentially about the holder central axis C. In accordance with some embodiments of the subject matter of the present application, the shank portion 70 can be elongated in the axial direction.

The tool holder 22, 122 also includes a coupling portion 74. The coupling portion 74 is disposed at a forward end of the shank portion 70. In accordance with some embodiments of the subject matter of the present application, the shank portion 70 and the coupling portion 74 can be separable from each other so that the tool holder 22 has a modular construction (see FIGS. 1 and 2). In such a configuration the coupling portion 74 includes a coupling portion through hole 73, which allows passage of the fastening member to a threaded bore as described hereinafter. In accordance with some other embodiments of the subject matter of the present application, the shank portion 70 and the coupling portion 74 can be integrally formed together so that the tool holder 122 has a unitary, one-piece construction (see FIGS. 11 and 12).

Figure 12:
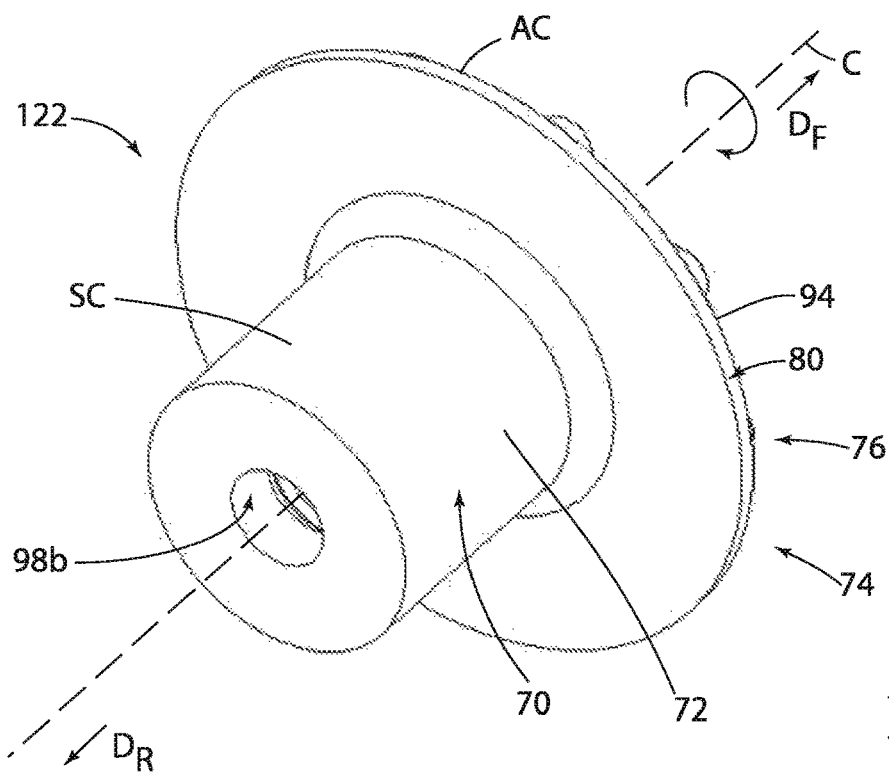
FIG. 12 is another perspective view of the tool holder shown in FIG. 11.

Referring to FIGS. 2 and 12, the shank peripheral surface 72 adjoining the coupling portion 74 defines an imaginary shank cylinder SC having an axis aligned with the holder central axis C. The imaginary shank cylinder SC has a shank outer diameter $OD_S$. In this non-limiting example shown in the drawings, the shank peripheral surface 72 adjoining the coupling portion 74 can lie entirely on the imaginary shank cylinder SC. The entire shank peripheral surface 72 can lie on the imaginary shank cylinder SC. In accordance with some embodiments of the subject matter of the present application, the coupling portion 74 can exhibit rotational symmetry about the holder central axis C.

The coupling portion 74 includes an alignment portion 76. The alignment portion 76 includes a forward facing alignment forward surface 78. The alignment forward surface 78 is bounded by an alignment peripheral surface 80. The alignment peripheral surface 80 extends circumferentially about the holder central axis C.

Referring to FIG. 10, the coupling portion 74 can optionally include an extension portion 83 extending rearwardly from the alignment portion 76. The extension portion 83 includes an extension peripheral surface 83a which extends circumferentially about the holder central axis C. As shown in FIG. 1, the extension portion 83 can be flush with the shank portion 70. Stated differently, the extension peripheral surface 83a and the shank peripheral surface 72 transition smoothly and continuously with each other. The alignment portion 76 has substantially the same radial dimension as the extension portion 83 and thus the shank portion 70.

Figure 11:
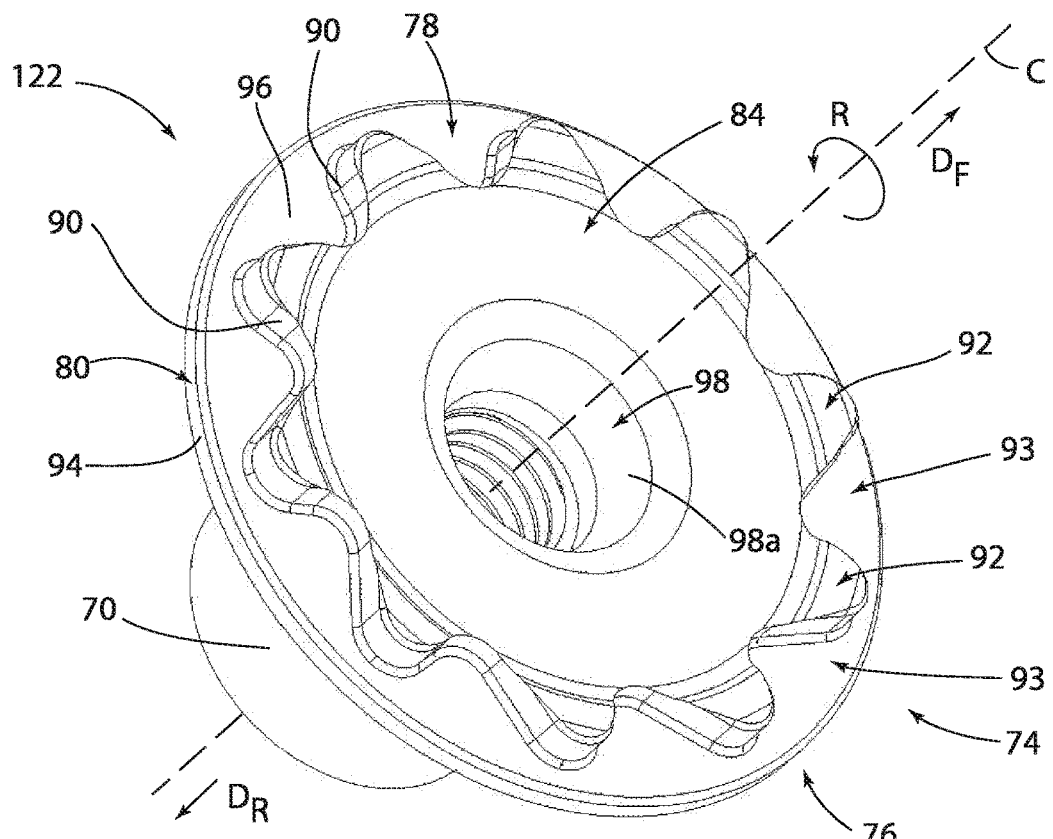
FIG. 11 is a perspective view of another tool holder, in accordance with the present application.

Alternately, in the non-limiting example shown in FIGS. 11-13, the tool holder 122 can be devoid of the extension portion 83. The alignment portion 76 can extend radially outwards beyond the shank portion 70. Stated differently, tool holder 122 can have a flanged configuration provided by the alignment portion 76 (i.e. the tool holder 122 is "flanged"). Preferably, the alignment portion 76 can extend radially outwards beyond the shank portion 70 about the entire circumferential extent of the shank portion 70.

In the flanged configuration of the tool holder 122, the alignment portion 76 can further include a rearward facing alignment rearward surface 82, opposite the alignment forward surface 78 (see FIG. 13). The alignment peripheral surface 80 can extend between the alignment forward and rearward surfaces 78, 82. The alignment portion 76 can have a disc-like basic shape defined by the alignment forward and rearward surfaces 78, 82 and the alignment peripheral surface 80.

The coupling portion 74 also includes a driving portion 84. The driving portion 84 projects forwardly from the alignment forward surface 78. The alignment forward surface 78 defines a boundary between the alignment portion 76 and the driving portion 84. The driving portion 84 can be radially inwards of the alignment portion 76 in all radial directions. The driving portion 84 includes a forward facing driving forward surface 86 bounded by a driving peripheral surface 88. The driving peripheral surface 88 extends circumferentially about the holder central axis C.

Figure 9:
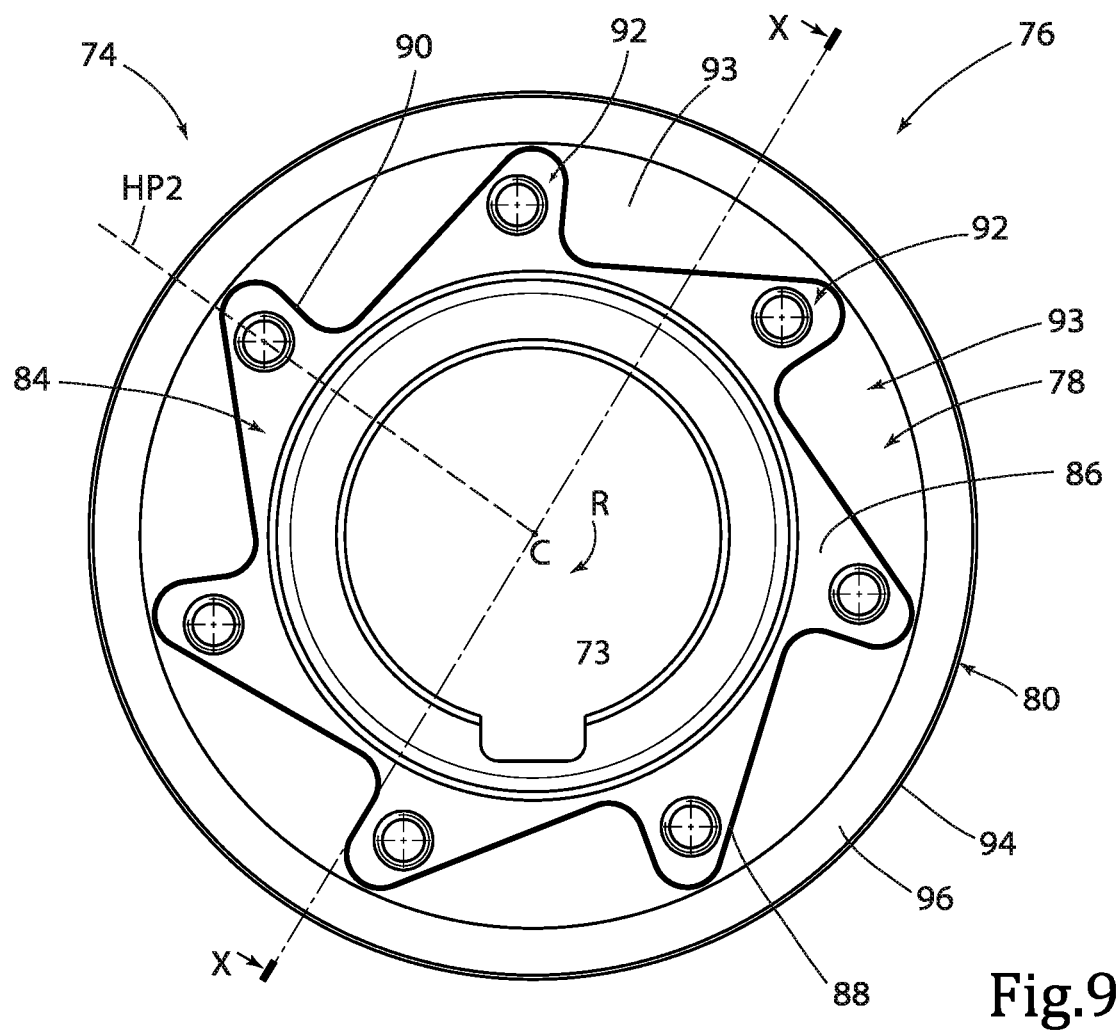
FIG. 9 is a forward end view of a coupling portion of a tool holder shown in FIG. 1.

Referring to FIGS. 9 and 11, the driving peripheral surface 88 includes at least one driving surface 90 which faces the rotational direction R. When the tool holder 22, 122 rotates about the holder central axis C torque is transferred to the milling head 24 via the driving surfaces. The at least one driving surface 90 can be planar and extend in an axial plane of the tool holder 22, 122 which contains the holder central axis B.

In the flanged configuration of the tool holder 122, the at least one driving surface 90 can be located on the coupling portion 74 so that it is disposed outside the imaginary shank cylinder SC (see FIG. 13). Advantageously, this increases the torque (for the same force) by virtue of the increased distance from the axis of rotation. Moreover, the flanged configuration of the tool holder 122 is advantageous for tool holders having a small shank outer diameter with limited area for the provision of a driving mechanism.

Referring to FIGS. 9 and 11, in accordance with some embodiments of the subject matter of the present application, the driving portion 84 can include at least one driving tooth 92 which extends radially outwardly. Each of the at least one driving surfaces 90 can be located on a respective driving tooth 92. Referring specifically to FIG. 9, the at least one driving teeth 92 can be mirror asymmetrical about all driving tooth axial half planes HP2 which contain the holder central axis C and intersect said at least one driving teeth 92. The driving portion 84 can include a plurality of driving teeth 92 angularly disposed about the holder central axis C. The adjacent pairs of driving teeth 92 can be spaced apart by a driving tooth gap 93. As seen in FIGS. 9 and 11, a coupling portion 74 may have six or more driving teeth 92, though other numbers of driving teeth 92 are also contemplated.

Referring to FIGS. 10 and 13, the alignment peripheral surface 80 includes at least one radial alignment surface 94 which faces radially outwardly. The at least one radial alignment surface 94 is located axially rearward of the at least one driving surface 90. The at least one radial alignment surface 94 is located radially outward from the at least one driving surface 90. The at least one radial alignment surface 94 can lie on an outer surface of an imaginary alignment cylinder AC having an axis aligned with the holder central axis C. The alignment cylinder AC has an alignment outer diameter $OD_A$. The alignment peripheral surface 80 can include exactly one radial alignment surface 94 which extends along an entire circumferential extent of the alignment peripheral surface 80. Referring to FIG. 13, in the flanged configuration of the tool holder 122, the at least one radial alignment surface 94 can adjoin the alignment rearward surface 82. The at least one radial alignment surface 94 can be located on the coupling portion 74 so that it is disposed outside the imaginary shank cylinder SC (See FIG. 13).

In the non-flanged configuration, the alignment outer diameter $OD_A$ can be substantially equal to the shank outer diameter $OD_S$. In the flanged configuration, the alignment outer diameter $OD_A$ can be greater than the shank outer diameter $OD_S$ (i.e. $OD_A > OD_S$). In accordance with some embodiments of the subject matter of the present application, the alignment outer diameter $OD_A$ can be greater than twice the shank outer diameter $OD_S$.

In accordance with some embodiments of the subject matter of the present application, the alignment forward surface 78 can include at least one forwardly facing axial support surface 96. The at least one axial support surface 96 can be located axially between the at least one driving surface 90 and the at least one radial alignment surface 94. The at least one axial support surface 96 can be located radially between the at least one driving surface 90 and the at least one radial alignment surface 94. The at least one axial support surface 96 can be planar and oriented perpendicularly to the holder central axis C. The at least one axial support surface 96 can be adjacent the alignment peripheral surface 96. The alignment forward surface 78 can include exactly one axial support surface 96 which extends along an entire circumferential extent of the alignment forward surface 78.

In accordance with some embodiments of the subject matter of the present application, the tool holder 22, 122 can include a threaded bore 98 which opens out to the driving forward surface 86 at a bore outlet opening 98a. The threaded bore 98 is for threadingly receiving the fastening member 68 as discussed hereinafter. In accordance with some embodiments of the subject matter of the present application, the threaded bore 98 can extend along the holder central axis C and thus be centrally located. The driven teeth 60 can be arranged about the bore outlet opening 98a. The threaded bore 98 can be a through bore having a bore rear inlet opening 98b.

Figure 16:
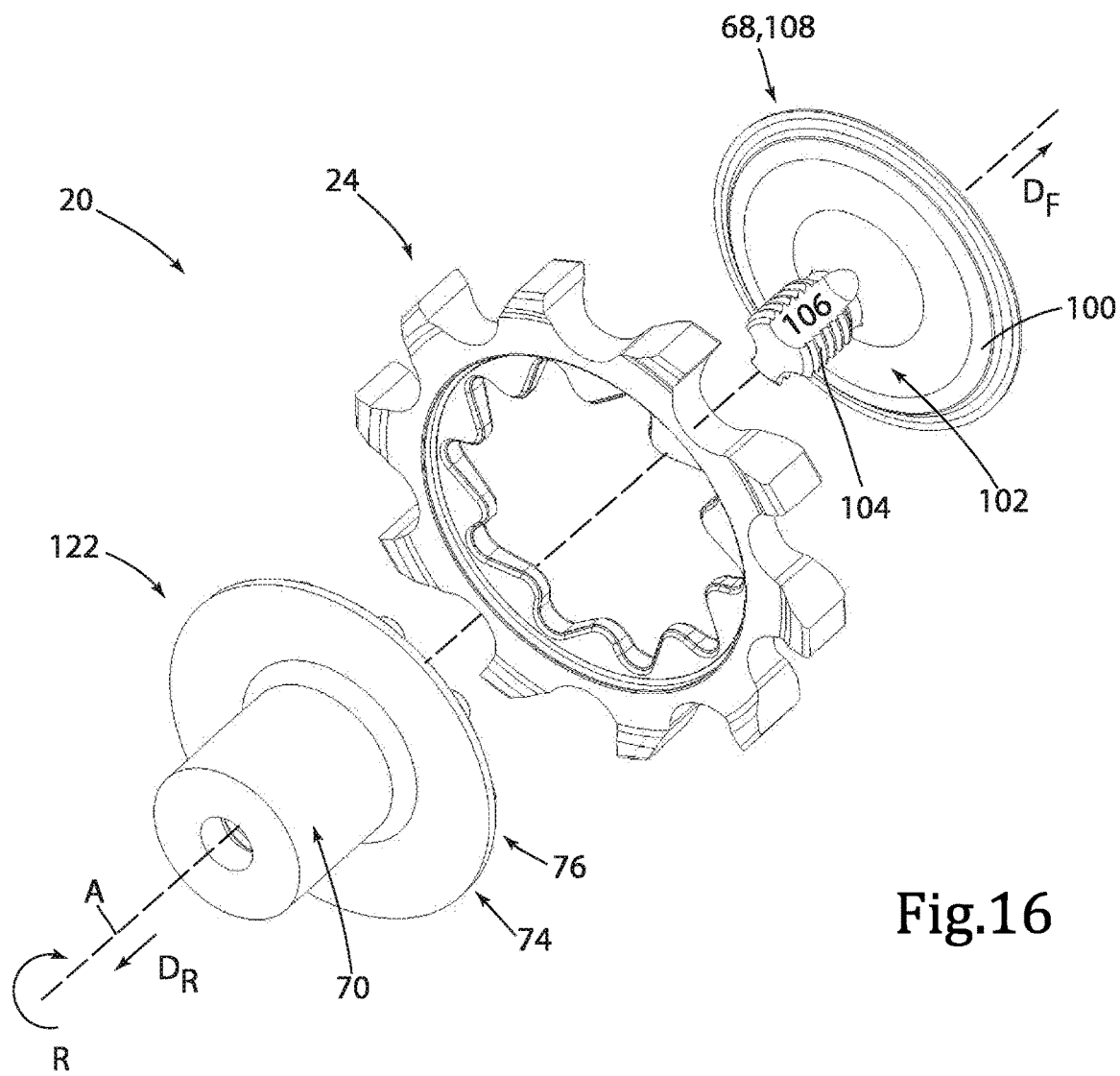
FIG. 16 is an exploded perspective view of another rotary milling tool having the tool holder shown in FIGS. 11 and 12, in accordance with the present application.
Figure 17:
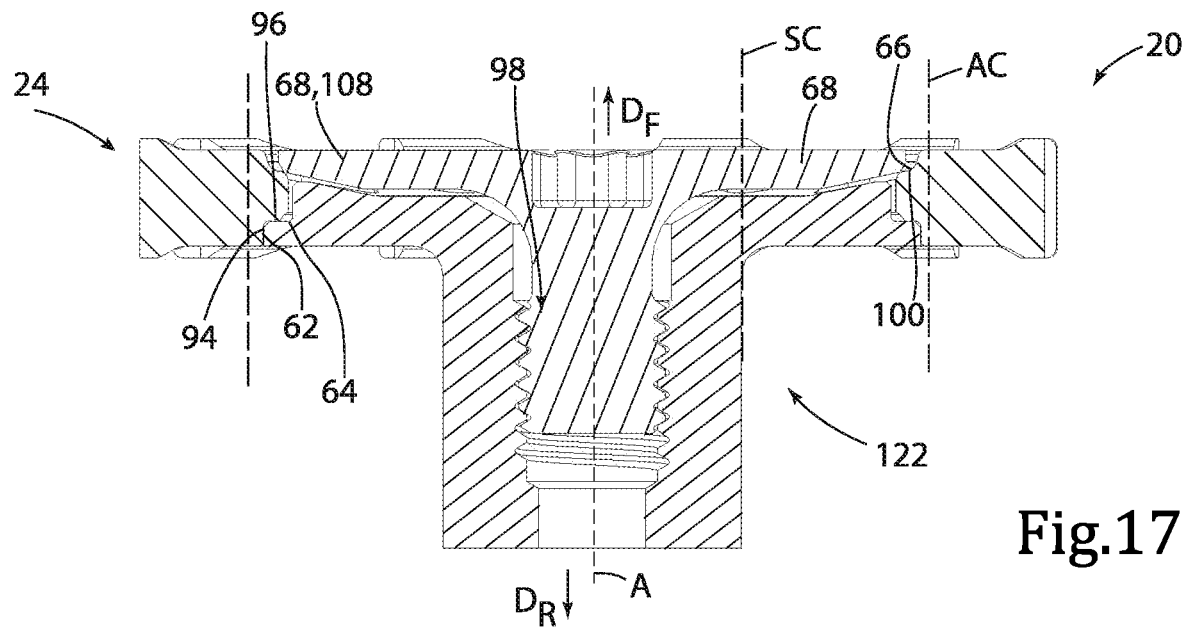
FIG. 17 is an axial cross-sectional view of the assembled rotary milling tool shown in FIG. 16.

Reverting to FIGS. 1, 2 and 16, the milling head 24 is releasably clamped to the tool holder 22, 122 by the fastening member 68 to form an assembled state of the rotary milling tool 20. As shown in FIG. 16, the fastening member 68 includes a fastening head 100 and a male member 102 projecting therefrom. The male member 102 includes an external thread 104. In accordance with some embodiments of the subject matter of the present application, the fastening member 68 can be an integrally formed retaining screw 108 having unitary one-piece construction. The external thread 104 can include at least one unthreaded portion 106 which extends from both ends of the external thread 104 so that the external thread 104 is non-continuous. The bore rear inlet opening 98b can be in fluid communication with the bore outlet opening 98a via the at least one unthreaded portion 106. Thus, cooling fluid can be directed onto the plurality of cutting edges 32.

Figure 14:
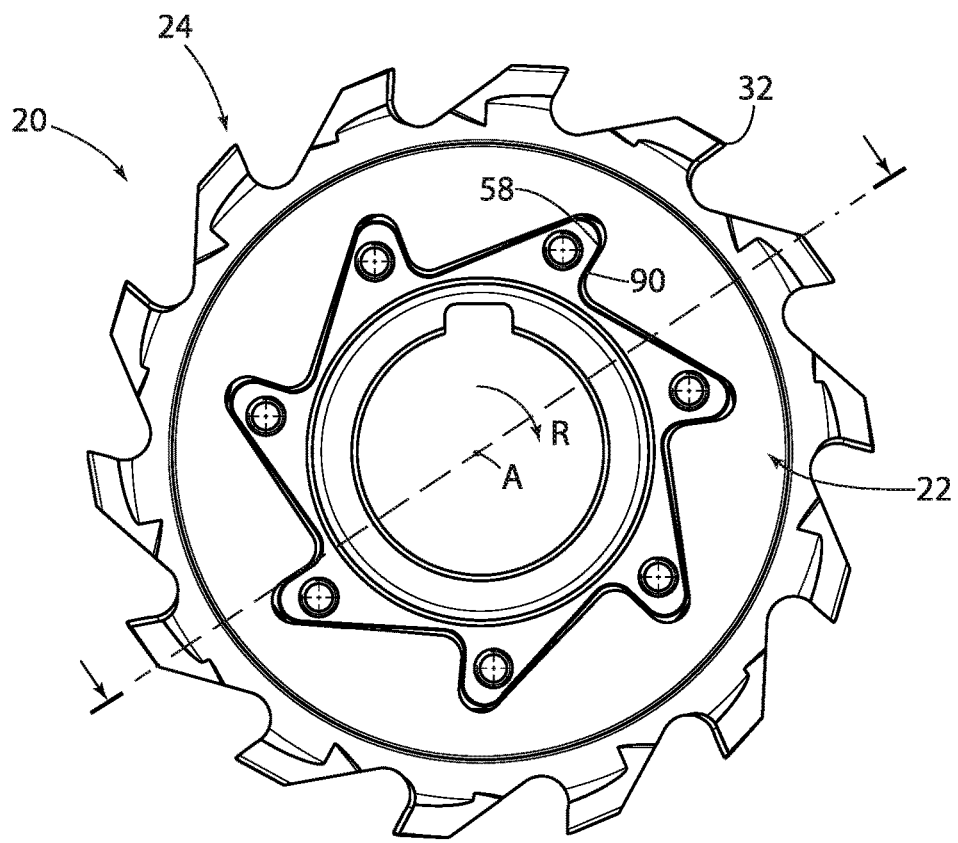
FIG. 14 is a forward end view of the rotary milling tool shown in FIG. 1 without a fastening member.
Figure 15:
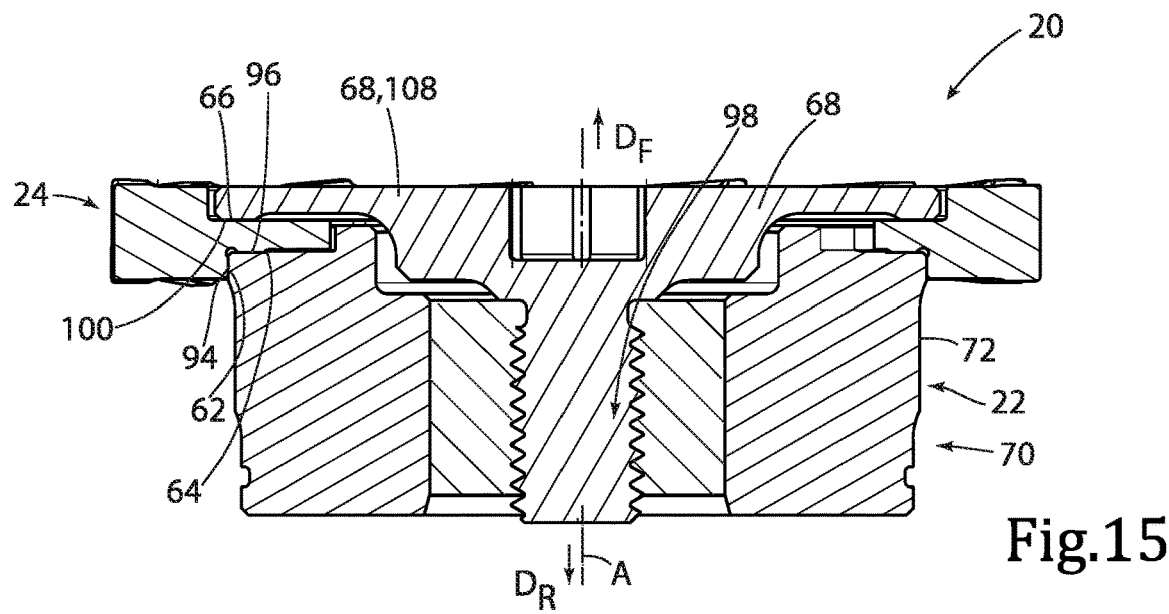
FIG. 15 is an axial cross-sectional view of the rotary milling tool shown in FIG. 1.

Reference is now made to 13, 14 and 16. In the assembled position of the rotary milling tool 20, the fastening member 68 is located in the head through recess 44 and threadingly engaged with the threaded bore 98. Making reference in particular to FIGS. 14 and 15, the at least one driven surface 58 abuts the at least one driving surface 90. The at least one radial centering surface 62 abuts the at least one radial alignment surface 94. In accordance with some embodiments of the subject matter of the present application, the driven teeth 60 can be located in the driving tooth gaps 93. The at least one axial bearing surface 64 can abut the at least one axial support surface 96. The fastening member 68 can clampingly abut the milling head 24 at the at least one clamping surface 66. The fastening member 68 (specifically the fastening head 100) may not extend beyond the head forward plane PF in the forward direction $D_F$.

In the assembled position of the rotary milling tool 20, the milling head 24 and the tool holder 22, 122 are co-axial. Stated differently, the head central axis B and the holder central axis C are co-incident with the tool central axis A.

Figure 18:
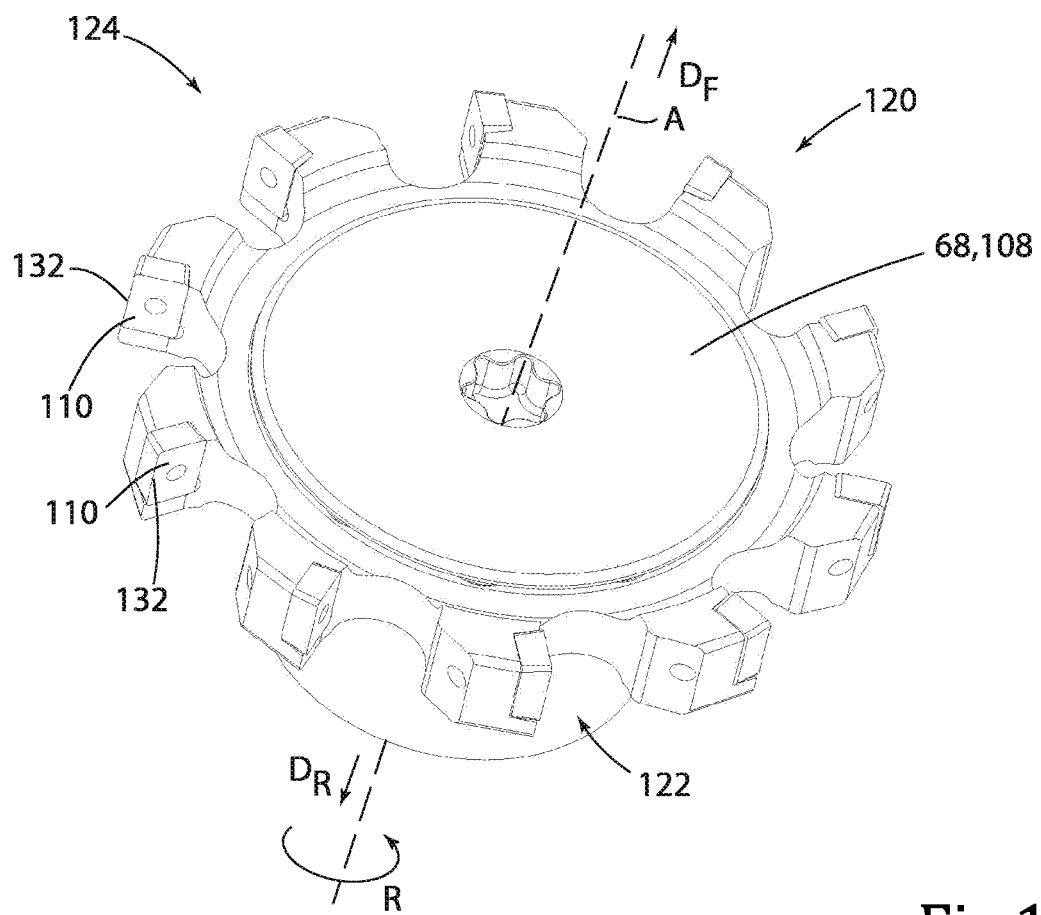
FIG. 18 is a perspective view of another rotary milling tool, having a rotary milling head not in accordance with the invention.

Reference is now made to FIG. 18, showing a cutting tool 120 having a milling head 124 in which the plurality of cutting edges 132 are formed on separate cutting inserts 110 that are releasably attached to the milling head 124. The milling head 124 can form a face milling cutting tool 120 suitable for face milling cutting operations. The cutting inserts 110 can be arranged in a single axial row. In milling head 124, the effective cutting edge does not extend continuously across the entire axial extent of the periphery of the milling head 124. Its effective cutting edge length defines the depth of cut in a work piece when the milling head 124 rotates in the rotational direction R and enters the work piece. It is noted that such a milling head 124 can be releasably attached to tool holders similar to the tool holders 122, 22 described above (i.e. having a flanged or non-flanged configuration), so long as the milling head 124 is provided with appropriate driven teeth, not unlike those described above.

It is noted that the rotary cutting tools 20, 120 shown in FIGS. 16 and 18, respectively, and the tool holder 122 provided therewith (as shown in FIGS. 11-13, i.e. having the flanged configuration) rotates in the opposite rotational direction than that of the tool holder 22 shown, for example, in FIGS. 1 and 2 (i.e. having the non-flanged configuration).

Although the subject matter of the present application has been described to a certain degree of particularity, it should be understood that various alterations and modifications could be made without departing from the spirit or scope of the invention as hereinafter claimed.

What is claimed is:

1. A milling head (24) having a head central axis (B) that defines opposite forward and rearward directions ($D_F$, $D_R$) and about which the milling head (24) is rotatable in a rotational direction (R), the milling head (24) comprising:

opposing head forward and rearward surfaces (26, 28) and a head peripheral surface (30) extending therebetween, the head peripheral surface (30) extending circumferentially about the head central axis (B);

a plurality of angularly spaced apart peripherally disposed cutting edges (32) whose rotational loci in a head axial half plane containing the head central axis (B) define an effective cutting edge (38) having an effective cutting edge length (L) measured in the axial direction, the effective cutting edge length (L) being defined by axially spaced apart opposing cutting edge extremities (38a, 38b) of the effective cutting edge (38), each cutting edge (32) being formed at the intersection of a rotationally forward rake surface (34) and a rotationally rearward relief surface (36) and being integrally formed with the milling head (24) to have unitary one-piece construction therewith; and a head through recess (44) extending along the head central axis (B) and opening out to the head forward and rearward surfaces (26,28), the head through recess (44) being defined by a recess peripheral surface (46) and comprising:

a centering region (52);

a driven region (54) axially forward of, and non-identical to, the centering region (52); and a fastening head receiving region (56) axially forward of the driven region (54), and non-identical to both the driven region (54) and the centering region (52);

wherein:

the recess peripheral surface (46) at the driven region (54) comprises at least one driven surface (58) facing opposite the rotational direction (R);

the recess peripheral surface (46) at the centering region (52) comprises at least one radially inwardly facing radial centering surface (62) which is located axially rearward of the at least one driven surface (58), the radially inwardly facing radial centering surface (62), in its entirety, being radially outward from the at least one driven surface (58);

the two opposing extremities (38a, 38b) of the effective cutting edge (38) define two parallel head forward and rearward planes (PF, PR) respectively, the head forward and rearward planes (PF, PR) being oriented perpendicularly to the head central axis (B) and spaced apart by the effective cutting edge length (L); and both the at least one driven surface (58) and the at least one radial centering surface (62) are disposed between the head forward and rearward planes (PF, PR).

2. The milling head (24), according to claim 1, wherein the milling head (24) comprises:

a plurality of angularly spaced apart cutting portions (40) extending radially outwardly, each cutting edge (32) being located at a respective cutting portion (40); and a plurality of angularly spaced apart chip flutes (42) which circumferentially alternate with the plurality of cutting portions (40) along the head peripheral surface (30), each chip flute (42) opening out to at least one of the head forward surface (26) and the head rearward surface (28).

3. The milling head (24), according to claim 2, wherein each chip flute (42) opens out to both the head forward surface (26) and the head rearward surface (28).

4. The milling head (24), according to claim 1, wherein each cutting edge (32) extends across the head peripheral surface (30) from the head forward surface (26) to the head rearward surface (28).

5. The milling head (24), according to claim 1, wherein each cutting edge (32) extends continuously across the head peripheral surface (30).

6. The milling head (24), according to claim 1, wherein the at least one radial centering surface (62) lies on an inner surface of an imaginary centering cylinder (CC) having an axis aligned with the head central axis (B).

7. The milling head (24), according to claim 1, wherein the recess peripheral surface (46) at the centering region (52) comprises exactly one radial centering surface (62) which extends along an entire circumferential extent of the recess peripheral surface (46).

8. The milling head (24), according to claim 1, wherein the recess peripheral surface (46) comprises at least one rearwardly facing axial bearing surface (64) located axially between the at least one driven surface (58) and the at least one radial centering surface (62).

9. The milling head (24), according to claim 8, wherein the at least one axial bearing surface (64) is located radially between the at least one driven surface (58) and the at least one radial centering surface (62).

10. The milling head (24), according to claim 8, wherein the recess peripheral surface (46) comprises exactly one axial bearing surface (64) which extends along an entire circumferential extent of the recess peripheral surface (46).

11. The milling head (24), according to claim 1, wherein no part of the milling head (24) extends beyond the head rearward plane (PR) in the rearward direction ($D_R$) and no part of the milling head (24) extends beyond the head forward plane (PF) in the forward direction ($D_F$).

12. The milling head (24), according to claim 1, wherein:
the recess peripheral surface (46) at the driven region (54) comprises at least one driven tooth (60) projecting radially inwardly; and
each of the at least one driven surfaces (58) is located on a respective driven tooth (60).

13. The milling head (24), according to claim 12, wherein the at least one driven tooth (60) is mirror asymmetrical about all driven tooth axial half planes (HP1) containing the head central axis (B) and intersecting said at least one driven tooth (60).

14. The milling head (24), according to claim 12, wherein the recess peripheral surface (46) at the driven region (54) comprises a plurality of driven teeth (60) angularly disposed about the head central axis (B).

15. The milling head (24), according to claim 1, wherein the recess peripheral surface (46) comprises at least one forwardly facing clamping surface (66) located axially forward of the at least one driven surface (58).

16. The milling head (24), according to claim 15, wherein the clamping surface (66) is located radially outward from the at least one driven surface (58).

17. The milling head (24), according to claim 1, wherein:
in axial view thereof, the milling head (24) has a head circumscribed circle (CCC) defined by the plurality of cutting edges (32) and a head inscribed circle (IC) defined by radially innermost portions of the recess peripheral surface (46);
the head circumscribed circle (CCC) has a head circumscribed circle diameter (CCD) and the head inscribed circle (IC) has a head inscribed circle diameter (ICD); and
the head inscribed circle diameter (ICD) is greater than a third of the head circumscribed circle diameter (CCD).

18. A rotary milling tool (20) comprising:
a milling head (24), in accordance with claim 1; and
a tool holder (22, 122), having a holder central axis (C) that defines opposite forward and rearward directions ($D_F$, $D_R$) and about which the tool holder (22, 122) is rotatable in the rotational direction (R), the tool holder (22, 122) comprising:
a shank portion (70) comprising a shank peripheral surface (72) which extends circumferentially about the holder central axis (C); and
a coupling portion (74) disposed at a forward end of the shank portion (70), the coupling portion (74) comprising:
an alignment portion (76) comprising a forward facing alignment forward surface (78) bounded by an alignment peripheral surface (80) which extends circumferentially about the holder central axis (C); and
a driving portion (84) projecting forwardly from the alignment forward surface (78) and comprising a forward facing driving forward surface (86) bounded by a driving peripheral surface (88) which extends circumferentially about the holder central axis (C); wherein:
the driving peripheral surface (88) comprises at least one driving surface (90) facing the rotational direction (R);
the alignment peripheral surface (80) comprises at least one radially outwardly facing radial alignment surface (94) located axially rearward of, and radially outward from, the at least one driving surface (90); wherein:
the milling head (24) is releasably attached to the tool holder (22, 122).

19. The rotary milling tool (20), according to claim 18, wherein:
the at least one driven surface (58) of the milling head (24) abuts the at least one driving surface (90) of the coupling portion (74); and
the at least one radial centering surface (62) of the milling head (24) abuts the at least one radial alignment surface (94) of the coupling portion (74).

20. The rotary milling tool (20), according to claim 19, wherein:
on the milling head (24), the recess peripheral surface (46) comprises at least one rearwardly facing axial bearing surface (64) located axially between the at least one driven surface (58) and the at least one radial centering surface (62);
on the coupling portion (74), the alignment forward surface (78) comprises at least one forwardly facing axial support surface (96) located axially between the at least one driving surface (90) and the at least one radial alignment surface (94); and
the at least one axial bearing surface (64) abuts the at least one axial support surface (96).

21. The rotary milling tool (20), according to claim 18, wherein:
the tool holder (22, 122) comprises a threaded bore (98) opening out to the driving forward surface (86) at a bore outlet opening (98a); and
the milling head (24) is releasably clamped to the tool holder (22, 122) by a fastening member (68) located in the head through recess (44) and threadingly engaged with the threaded bore (98).

22. The rotary milling tool (20), according to claim 21, wherein:
the recess peripheral surface (46) comprises at least one forwardly facing clamping surface (66) located axially forward of the at least one driven surface (58);
the fastening member (68) comprises a fastening head (100); and
the fastening head (100) clampingly abuts the milling head (24) at the at least one clamping surface (66).

23. The rotary milling tool (20), according to claim 21, wherein:
the fastening member (68) has an external thread (104) which comprises at least one unthreaded portion (106) extending from both ends of the external thread (104) so that the external thread (104) is non-continuous; and
the threaded bore (98) is a through bore having a bore rear inlet opening (98b);
the bore rear inlet opening (98b) is in fluid communication with the bore outlet opening (98a) via the at least one unthreaded portion (106).

24. The milling head (24) according to claim 1, wherein:
the milling head (24) has a median plane (M) parallel to the head forward and rearward planes (PF, PR) and located midway therebetween; and
the effective cutting edge (38) extends continuously between the head forward and rearward planes (PF, PR), and through the median plane (M).

25. The milling head (24) according to claim 24, wherein:
in said axial direction, both the at least one driven surface (58) and the at least one radial centering surface (62) are entirely disposed between the head forward and rearward planes (PF, PR).

26. The milling head (24) according to claim 25, wherein:
the effective cutting edge length (L) defines the maximum axial dimension of the milling head (24) as measured in the axial direction.

27. The milling head (24) according to claim 1, wherein:
in said axial direction, both the at least one driven surface (58) and the at least one radial centering surface (62) are entirely disposed between the head forward and rearward planes (PF, PR).

28. The milling head (24) according to claim 1, wherein:
the recess peripheral surface (46) at the driven region (54) comprises a plurality of driven teeth (60) projecting radially inwardly; each of said plurality of driven teeth (60) comprising at least one driven surface (58);
the radially inwardly facing radial centering surface (62), in its entirety, is radially outward from all of the driven surfaces (58).

29. The milling head (24) according to claim 28, wherein:
each of said plurality of driven teeth (60) includes two opposing forward and rearward driven tooth side walls (61a, 61b);
the fastening head receiving region (56) and the driven region (54) are delimited by an upper plane (UP) defined by the forward driven tooth side walls (61a);
the centering region (52) and the driven region (54) are delimited by a lower plane defined by the rearward driven tooth side walls (61b); and
the radially inwardly facing radial centering surface (62), in its entirety, is radially outward from the at least one driven surface (58).

* * * * *